United States Patent [19]

Filippi

[11] Patent Number: 5,525,876
[45] Date of Patent: Jun. 11, 1996

[54] SAFETY CUTOFF POWER WINDOW CONTROL DEVICE

[75] Inventor: Aldo Filippi, Turin, Italy

[73] Assignee: Roltra Morse S.p.A., Rivoli, Italy

[21] Appl. No.: 266,222

[22] Filed: Jun. 27, 1994

[51] Int. Cl.⁶ .................................................. H02P 3/00
[52] U.S. Cl. ........................... 318/282; 318/466; 49/26
[58] Field of Search .................................. 318/280–286, 318/466–470; 49/26, 28, 29, 118; 160/293.1, 291

[56] References Cited

U.S. PATENT DOCUMENTS

| | | | |
|---|---|---|---|
| 4,347,465 | 8/1982 | Goertler et al. | 318/466 X |
| 4,364,003 | 12/1982 | Phipps | 318/467 |
| 4,453,112 | 6/1984 | Sauer et al. | 318/281 |
| 4,621,452 | 11/1986 | Deeg | 49/28 |
| 4,641,067 | 2/1987 | Iizawa et al. | 318/286 X |
| 4,732,238 | 3/1988 | Baumgartner | 49/26 X |
| 4,983,896 | 1/1991 | Sugiyama et al. | 318/286 |
| 5,069,000 | 12/1991 | Zuckerman | 49/28 |

FOREIGN PATENT DOCUMENTS

| | | |
|---|---|---|
| 3303590 | 9/1984 | Germany . |
| 2010957 | 4/1979 | United Kingdom . |
| 2169105 | 2/1986 | United Kingdom . |

Primary Examiner—Jonathan Wysocki
Attorney, Agent, or Firm—Ladas & Parry

[57] ABSTRACT

A control device for detecting the presence of an obstacle on the basis of the current absorbed by the motor controlling the window in the course of an opening or closing stroke. For effectively distinguishing an obstacle from other factors, such as defects on the window guide resulting in a regular, local increase in current absorption, the current measurement is integrated and compared with threshold values varying within the stroke and describing a reference line consisting of a number of line portions, each equal in value to the integral of the current in a respective portion of the stroke in the absence of an obstacle.

6 Claims, 2 Drawing Sheets

SAFETY CUTOFF POWER WINDOW CONTROL DEVICE

BACKGROUND OF THE INVENTION

The present invention relates to a safety cutoff power window control device.

As we know, power window control devices normally comprise a circuit supplied with an enabling signal from one or more switches, and which provides for correct polarity supply of one or more electric motors connected to, and for controlling opening or closing of, a respective window. If the device is designed for automatically controlling the opening and closing functions, the circuit provides for supplying the motor until opening or closing of the respective window is completed.

A major drawback of automatically controlled power windows is that, in the event of an obstacle impeding operation of the window (especially when closing it), considerable operating power is generated, which may possibly result in personal injury in the case of obstacles consisting of parts of the body.

By way of a solution to the above problem, automatic control devices feature a safety system, which detects the power generated by the motor (normally by measuring current absorption of the motor) and, over and above a predetermined threshold value, provides for briefly backing up and then stopping the window.

Unfortunately, however, the power required for closing the window varies in time, as well as at different points within the overall stroke of the window. In particular, the window guides may present local defects or unevenness, so that, for closing the window, greater power is required at certain points as compared with others within the overall stroke of the window. Other factors capable of seriously affecting the average power required for closing the window include temperature, particularly low temperatures resulting in freezing of the seals; and ageing of the seals resulting in impaired elasticity and possibly also distortion. In each of the above cases, a low threshold value may at times prevent the window from being fully closed by virtue of the required power being, at least at certain points or in certain situations, greater than the set threshold value. On the other hand, a high threshold value is ruled out for safety reasons.

One proposal already made for overcoming the time-dependent variation in the power required for closing the window is to measure the current absorption of the motor at the initial closing stage, and modify the threshold value accordingly on the basis of the measured value. On known devices of this type, the threshold value is assigned a given tolerance within which the closing power is considered acceptable, whereas the final closing stage is assigned a much higher tolerance to prevent activating the safety system which would otherwise prevent the window from being fully closed. According to this known solution, the threshold value may be represented by a straight line increasing from a minimum, when the window is fully lowered, to a maximum when the window is almost fully raised.

Though the above known solution does in fact provide for solving the problem of time-dependent variations in closing power due to atmospheric conditions or component ageing, the same cannot be said for variations occurring regularly during and at each stroke of the window.

Moreover, automatic power window devices are gradually becoming a standard feature of increasingly lower class vehicles, the poorer finish and workmanship of which increase the likelihood of high power points being misinterpreted as obstacles and so preventing troublefree operation of the window.

SUMMARY OF THE INVENTION

It is an object of the present invention to provide a control device also designed to take into account local variations in closing power occurring regularly during and at each stroke of the window.

According to the present invention, there is provided a safety cutoff power window control device comprising means for detecting the value of a quantity related to the operating power required for effecting an opening or closing stroke of the window; and processing means for identifying an obstacle on the basis of a predetermined threshold, and for arresting operation of the window in the presence of an obstacle; characterized by the fact that said threshold comprises a reference line consisting of a number of line portions, the value of each line portion being equal to the integral of said quantity within a respective portion of said stroke in the absence of an obstacle; and by the fact that said processing means comprise integrating means for integrating the values of said quantity detected within said stroke portions; and comparing means for comparing the present output value of said integrating means with a respective portion of said reference line, for identifying an obstacle.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

For the sake of simplicity, the accompanying drawings show a single window control device, though the following description also applies of course to centralized control devices for operating all the windows on the vehicle, by providing an appropriate number of control inputs from the switches and a corresponding number of actuators (motors).

Figure 1:
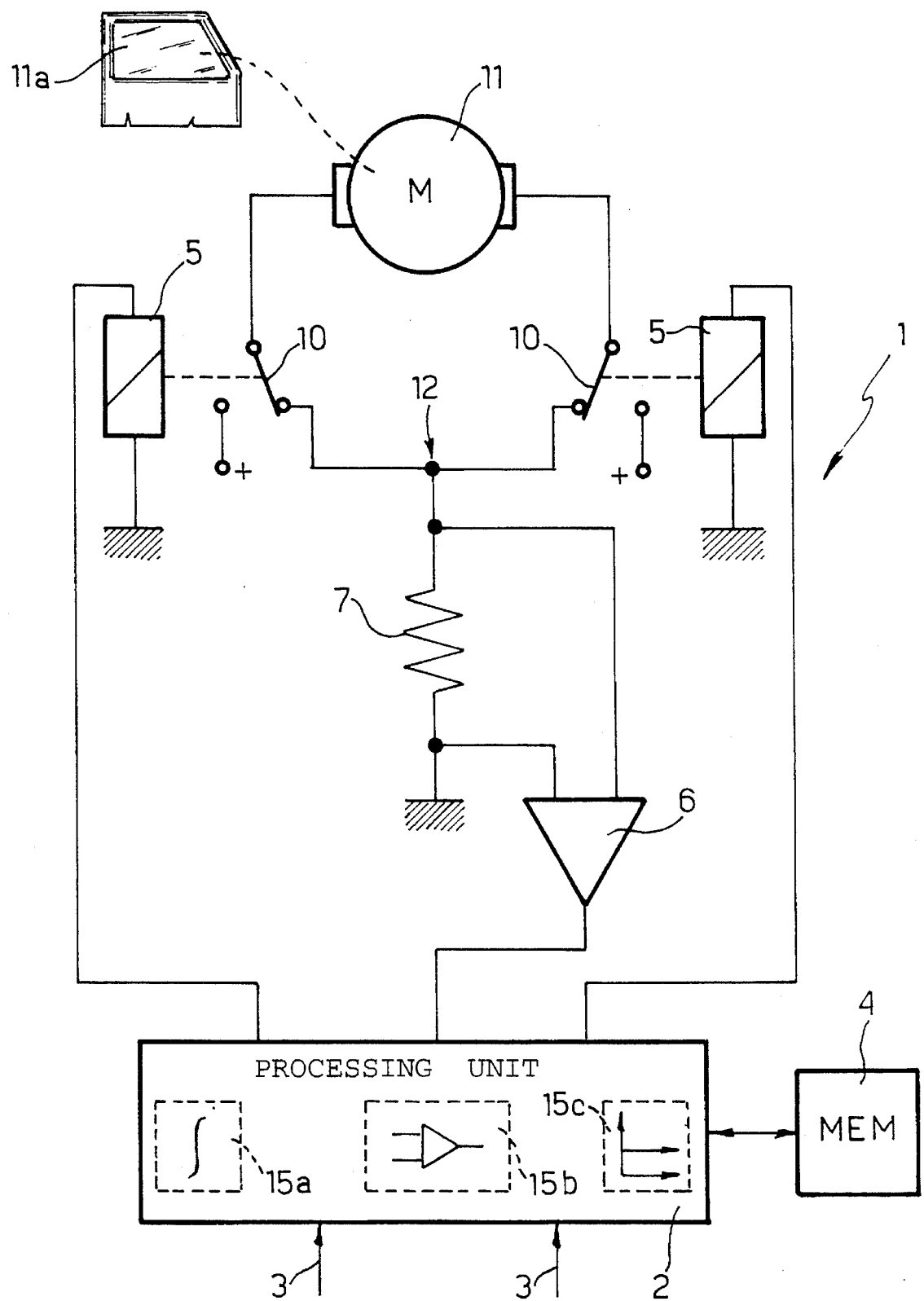
FIG. 1 shows a block diagram of the control device according to the present invention.

Number 1 in FIG. 1 indicates a control device comprising, in known manner, a microprocessor unit 2 having two inputs 3 supplied respectively with opening and closing signals by a switch (not shown).

Processing unit 2 is connected to a memory 4; to a pair of relays 5; and to the output of a differential amplifier 6, the inputs of which are connected to respective terminals of a detecting resistor 7. Each relay 5 presents a movable contact 10 for alternatively connecting a respective terminal of motor 11 controlling window 11a to a supply voltage or to a common point 12 connected to one terminal of resistor 7. The other terminal of resistor 7 is grounded.

As shown schematically in FIG. 1 and explained in more detail later on, processing unit 2 defines integrating means, comparing means and shift means indicated respectively by blocks 15a, 15b and 15c.

In known manner, and depending on the signal at inputs 3, processing unit 2 supplies one of relays 5, the contact 10 of which switches from the idle position (FIG. 1) to a position wherein it supplies and operates motor 11 in the required direction, and, via means not shown, provides for opening or closing the respective window.

Again in known manner, processing unit 2 controls operation of the window on the basis of the current absorbed by the motor and detected by resistor 7, so as to disconnect motor 11 at the end of the stroke, or rapidly invert and arrest the motor in the event an obstacle is encountered in the course of the opening or closing stroke.

Operation of processing unit 2 in the event of an obstacle will now be described with reference to FIG. 2, which shows an experimental on-vehicle time graph of current I relative to an obstaclefree closing stroke (curve 16 to the left) and opening stroke (curve 17 to the right). As can be seen, particularly during the closing stroke, curve 16 initially presents a current peak due to startup of the motor, followed by a more or less constant portion except for three short peaks 18 at which current absorption by the motor may increase by more than 1–2 a as compared with the adjacent points, and at which the safety system is normally activated so that the window cannot be closed automatically even in the absence of an obstacle. The final portion of the stroke again presents, this time, a very high current peak, at which point, however, the safety system is disabled.

To overcome the above problem, according to the present invention, the current absorbed by the motor is integrated at regular intervals of, say, 0.1 s, and compared with the value of the integral corresponding to the same stroke portion and memorized previously.

Figure 2:
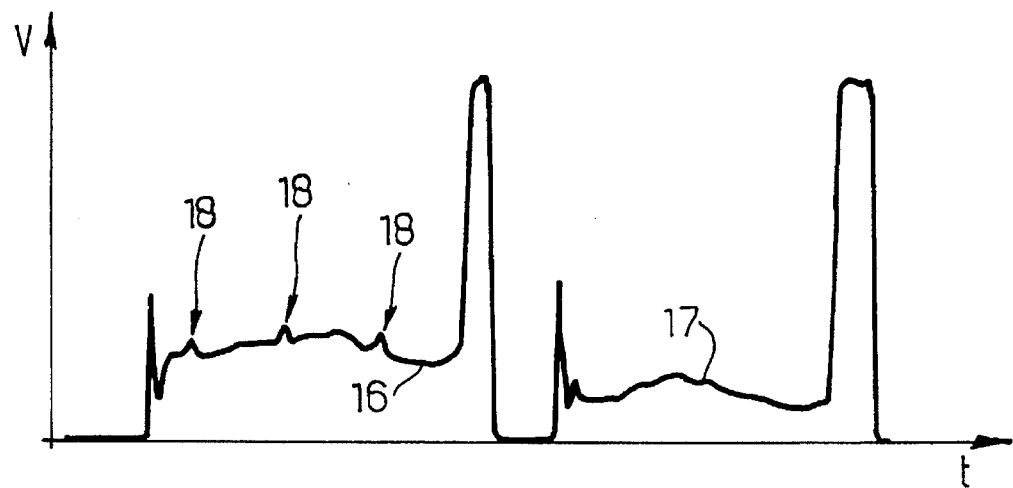
FIGS. 2 and 3 show graphs of quantities relative to the stroke of the window.
Figure 3:
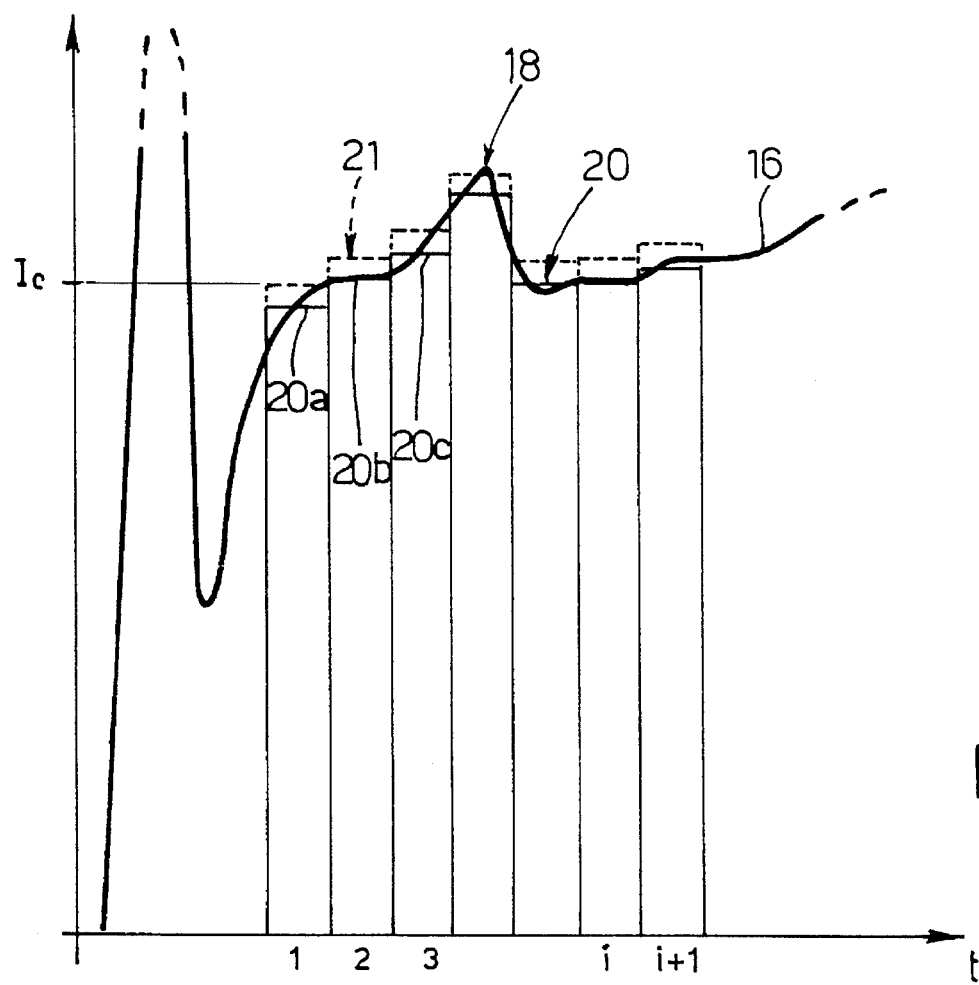

More specifically, FIG. 3 shows a larger-scale view of the initial portion of closing stroke 16 in FIG. 2, with, overlying the current curve and as shown by the continuous line portions, the broken line formed by dividing the current curve during the stroke into a number of time intervals 1, 2, ..., i, i+1, ..., and by integrating the corresponding portion of the current curve in each time interval. As can be seen, the resulting broken line follows the original curve, and presents a maximum value at the peaks.

The device according to the present invention therefore provides initially for measuring and calculating the integral of the current absorbed by the motor, as described above, so as to obtain a reference line 20 (FIG. 3) including a number of portions 20a, 20b, 20c, ..., and which is stored in memory 4 of control device 1 and compared with the value calculated each time by processing unit 2 on the basis of the current measured at each stroke of the window and relative to the same stroke portion. If the value of the integral in the i-th interval is greater than the corresponding stored value plus a predetermined tolerance, this means the closing power is greater than that normally required, in the absence of an obstacle, for completing the stroke portion in question, thus indicating the presence of an obstacle. Processing unit 2 therefore provides for activating the safety function (backing up and arresting the window).

To take into account time-dependent variations in closing power, the integral of the current absorbed by the motor is preferably calculated in the first measuring interval (i.e. excluding the initial startup phase of the motor), and reference line 20 is shifted according to the calculated value. That is, if the calculated value equals, say, $I_c$, the reference line is shifted to give the dotted line 21 in FIG. 3. The value of the integral calculated each time is therefore compared with that of the corresponding portion of shifted line 21, still taking into account the predetermined tolerance.

Reference line 20 may be determined once and for all at the first stroke of the window, and stored permanently in memory 4; or the line formed by successive calculated values (characteristic of the last closing stroke) may be stored each time, and, at the next stroke, the values calculated one after the other may be compared with the corresponding portions of the previous line, possibly shifted on the basis of the value calculated in the first time interval and relative to the present stroke. In this way, the reference line is adapted continuously to objective conditions, such as ageing of the seals, even in the event of variations applying to only a few portions of the reference line, as opposed to uniform alteration of the reference line as a whole.

Instead of a predetermined tolerance, the device described may also employ different tolerance values for different intervals, e.g. a percentage of the value of the portion in question (possibly also with a check for determining crossover of an absolute maximum value which must never be exceeded), so that high power values are assigned high tolerance values. Conversely, the tolerance value of each interval may be inversely related to the value of the integral in the same interval. This constitutes a safer approach by preventing nonrecognition of an obstacle precisely when the normal power requirement is high and the risk of damage or personal injury is greater.

The advantages of the device according to the present invention will be clear from the foregoing description. Firstly, it provides for adapting the reference curve to even local variations in the power required, in the absence of an obstacle, for closing the window, thus enabling fitment of automatically controlled power windows to lower class vehicles of poorer workmanship, as well as for safely discriminating between more difficult points and actual obstacles.

Secondly, the device according to the present invention is easy to produce, and involves very few components. The required functions in fact may easily be implemented by a microprocessor, and the memory for storing the reference curve may also be of limited size, unlike systems, for example, involving the recording of analog or digital values of a large number of points from which to substantially reproduce the reference curve. What is more, the integral computing and comparing functions are easily performable using straightforward, reliable procedures, as suited to a device designed for on-vehicle assembly; and the monitoring and control unit may be implemented by an existing electronic control system on the vehicle for performing other functions, in which case, minimizing the storage space required in the memory becomes even more important, for enabling storage of data and information required by the control system for performing its other functions.

To those skilled in the art it will be clear that changes may be made to the device as described and illustrated herein without, however, departing from the scope of the present invention.

What is claimed is:

1. In a safety cutoff device for controlling a motor which drives a power window in opening and closing directions and wherein a circuit value, related to operating power of the motor in effecting opening and closing strokes of the window is detected and upon said circuit value exceeding a predetermined threshold, due to presence of an obstacle in the opening and closing strokes of the window, the operation of the motor is halted, the improvement comprising:

processing means for receiving a circuit value related to operating power of the motor, said processing means including integrating means for integrating at successive time intervals during the opening and closing strokes of the motor said circuit value then prevailing at each said time interval, comparing means receiving the thus integrated circuit values during said time intervals and comparing said integrated circuit values with reference values constituted by integrated circuit values in said time intervals during a preceding stroke in the same direction when said window did not encounter an obstacle, means for producing an output signal to halt said motor upon detection of an obstacle when out of said integrated values at a respective one of said predetermined time intervals exceeds, by a determined amount, said reference value at said one time interval when the window did not encounter an obstacle, and memory means for receiving said integrated circuit values in said time intervals when an obstacle is not encountered and for supplying said integrated circuit values to said comparing means as said reference values during a subsequent stroke of said window in the same direction.

2. The improvement as claimed in claim 1, wherein said processing means comprises shift means for receiving from said comparing means at the beginning of each stroke, any difference between the integrated circuit value and the reference value in a first predetermined time interval and applying said difference to all the reference values thereafter supplied by the memory means to said comparing means.

3. The improvement as claimed in claim 1, wherein said circuit value comprises current flow to said motor.

4. A method of halting a motor which drives a power window in opening and closing directions when an obstacle is present to oppose the opening and closing of the window, said method comprising:

measuring a circuit value related to operating power of a motor driving a power window in opening and closing strokes, integrating said circuit value in predetermined time intervals, supplying resulting integrated values to a memory when said power window undergoes opening and closing strokes and does not encounter an obstacle, said resulting integrated values producing a reference line comprised of a plurality of time portions formed by the integrated values in said predetermined time intervals, storing said integrated values representing said reference line in said memory, measuring said circuit values during a subsequent opening or closing stroke of the power window, integrating the thus measured circuit values during said predetermined time intervals in said subsequent opening or closing stroke, and comparing the integrated circuit values measured in said time intervals with the integrated values in said line portions of said reference line in the some time intervals, and signaling the presence of an obstacle, if the measured circuit values exceed the circuit values in said line portions of said reference line by a determined amount, to halt the motor.

5. A method as claimed in claim 4, wherein said measured circuit values indicate that no obstacle is present and said measured circuit values are memorized in said memory as the reference values of said reference line for the subsequent stroke of the window in the same direction.

6. A method as claimed in claim 4, wherein at the beginning of each stroke, the integrated measured value in a time interval is compared with the integrated reference value in the previous stoke in the line portion corresponding to the same time interval and upon detection of a difference between said integrated values, applying said difference to all the integrated reference values in said reference line subsequently to be compared with the integrated measured values.

* * * * *